United States Patent
Haddock et al.

(10) Patent No.: US 11,788,291 B2
(45) Date of Patent: Oct. 17, 2023

(54) MOUNTING DEVICE FOR CONTROLLING UPLIFT OF A METAL ROOF

(71) Applicant: RMH Tech LLC, Colorado Springs, CO (US)

(72) Inventors: Dustin M. M. Haddock, Colorado Springs, CO (US); Jesse Charles Winternitz, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 0 days.

(21) Appl. No.: 17/353,483

(22) Filed: Jun. 21, 2021

(65) Prior Publication Data

US 2021/0310249 A1 Oct. 7, 2021

Related U.S. Application Data

(63) Continuation of application No. 16/821,885, filed on Mar. 17, 2020, now Pat. No. 11,041,310.

(51) Int. Cl.
*E04D 3/362* (2006.01)
*E04D 3/30* (2006.01)

(52) U.S. Cl.
CPC ............... *E04D 3/362* (2013.01); *E04D 3/30* (2013.01)

(58) Field of Classification Search
CPC ............ E04D 3/361; E04D 3/362; E04D 3/30
See application file for complete search history.

(56) References Cited

U.S. PATENT DOCUMENTS

| | | |
|---|---|---|
| 1,279,669 A | 9/1918 | Deming |
| 1,463,065 A | 7/1923 | Sieger |
| 1,465,042 A | 8/1923 | Hruska |
| 1,477,088 A | 12/1923 | Turner |
| 1,511,529 A | 10/1924 | Standlee |
| 1,620,428 A | 3/1927 | Becker |

(Continued)

FOREIGN PATENT DOCUMENTS

| | | |
|---|---|---|
| AT | 13076 | 8/1903 |
| AT | 26329 | 11/1906 |

(Continued)

OTHER PUBLICATIONS

"ADJ Heavy Duty Lighting C-clamp," Sweetwater, 2011, 3 pages [retrieved online from: http://web.archive.org/web/20111112045516/http://www.sweetwater.com/store/detail/CClamp/].

(Continued)

*Primary Examiner* — Andrew J Triggs
(74) *Attorney, Agent, or Firm* — Sheridan Ross P.C.

(57) ABSTRACT

A clamp for controlling uplift of panels of a metal roof is provided where the clamp secures two adjacent panels together. In some embodiments, the clamp has a slot configured to receive a roof joint between adjacent panels, and the clamp has at least one arm that secures the roof joint within the clamp and prevents the clamp from being pulled off of the roof joint. In addition, the clamp may have a channel and at least one protrusion that locate the roof joint within the clamp in a predetermined position to ensure that a bar component such as a bolt or a set screw can secure the roof joint within the clamp. Moreover, further features and arrangements of features can better position the clamp over a center of the roof joint.

20 Claims, 8 Drawing Sheets

(56) References Cited

U.S. PATENT DOCUMENTS

| | | |
|---|---|---|
| 1,735,927 A | 11/1929 | Shaffer |
| 1,735,937 A | 11/1929 | Shaffer |
| 1,893,481 A | 1/1933 | Adams |
| 1,946,862 A | 2/1934 | Koch, Jr. |
| 1,957,933 A | 5/1934 | Brandl |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,221,467 A | 12/1965 | Henkels |
| 3,231,076 A | 1/1966 | Frieman |
| 3,232,393 A | 2/1966 | Atwwod |
| 3,232,573 A | 2/1966 | Berman |
| 3,242,620 A | 3/1966 | Kaiser |
| 3,247,316 A | 4/1966 | Weimer, Jr. |
| 3,288,409 A | 11/1966 | Bethea, Jr. |
| 3,296,750 A | 1/1967 | Zaleski |
| 3,298,653 A | 1/1967 | Omholt |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,565,380 A | 2/1971 | Langren |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,960,352 A | 6/1976 | Plattner et al. |
| 3,986,746 A | 10/1976 | Chartier |
| 3,998,018 A | 12/1976 | Hodges |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,051,289 A | 9/1977 | Adamson |
| 4,127,975 A | 12/1978 | Judkins |
| 4,130,970 A | 12/1978 | Cable |
| 4,141,182 A | 2/1979 | McMullen |
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |
| 4,189,891 A | 2/1980 | Johnson et al. |
| 4,200,107 A | 4/1980 | Reid |
| 4,203,646 A | 5/1980 | Desso et al. |
| 4,215,677 A | 8/1980 | Erickson |
| 4,223,053 A | 9/1980 | Brogan |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,291,934 A | 9/1981 | Kund |
| 4,307,976 A | 12/1981 | Butler |
| 4,321,416 A | 3/1982 | Tennant |
| 4,351,140 A | 9/1982 | Simpson |
| 4,358,916 A | 11/1982 | Lacasse |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A | 10/1985 | Knudson |
| 4,560,224 A | 12/1985 | Weisenburger |
| 4,567,706 A | 2/1986 | Wendt |
| 4,570,405 A | 2/1986 | Knudson |
| 4,588,240 A | 5/1986 | Ruehl et al. |
| 4,593,877 A | 6/1986 | van der Wyk |
| 4,601,600 A | 7/1986 | Karlsson |
| 4,656,794 A | 4/1987 | Thevenin et al. |
| 4,666,116 A | 5/1987 | Lloyd |
| 4,669,808 A | 6/1987 | Owen |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,864,081 A | 9/1989 | Bates |
| 4,878,331 A | 11/1989 | Taylor |
| 4,895,338 A | 1/1990 | Froutzis |
| 4,901,963 A | 2/1990 | Yoder |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| 4,970,833 A | 11/1990 | Porter |
| 4,987,699 A | 1/1991 | Gold |
| 4,991,368 A | 2/1991 | Amstutz |

(56) References Cited

U.S. PATENT DOCUMENTS

| | | |
|---|---|---|
| 4,993,959 A | 2/1991 | Randolph |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,164,020 A | 11/1992 | Wagner et al. |
| 5,176,462 A | 1/1993 | Chen |
| 5,187,911 A | 2/1993 | Cotter |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,615 A | 11/1994 | Christopher et al. |
| 5,363,624 A | 11/1994 | Cotter |
| 5,379,567 A | 1/1995 | Vahey |
| 5,390,453 A | 2/1995 | Untiedt |
| 5,391,084 A | 2/1995 | Kreitzman |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| 5,571,338 A | 11/1996 | Kadonome et al. |
| 5,596,858 A | 1/1997 | Jordan |
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,640,812 A | 6/1997 | Crowley et al. |
| 5,647,178 A | 7/1997 | Cline |
| 5,660,008 A | 8/1997 | Bevilacqua |
| 5,664,750 A | 9/1997 | Cohen |
| 5,667,181 A | 9/1997 | van Leeuwen et al. |
| D384,574 S | 10/1997 | Cox |
| 5,681,191 A | 10/1997 | Robicheau et al. |
| 5,688,131 A | 11/1997 | Byfield, Jr. |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,602,016 B2 | 8/2003 | Eckart et al. |

(56) References Cited

U.S. PATENT DOCUMENTS

| | | |
|---|---|---|
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressler |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,386,922 B1 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B2 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |
| 8,590,223 B2 | 11/2013 | Kilgore et al. |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,656,649 B2 | 2/2014 | Haddock |
| 8,683,751 B2 | 4/2014 | Stearns |
| 8,695,290 B1 | 4/2014 | Kim et al. |
| 8,701,354 B2 | 4/2014 | Stearns et al. |
| 8,701,372 B2 | 4/2014 | Nuernberger et al. |
| 8,713,881 B2 | 5/2014 | DuPont et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,875,463 B2 | 11/2014 | Plagemann et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,910,928 B2 * | 12/2014 | Header .............. F16B 2/065 52/24 |
| 8,920,586 B2 | 12/2014 | Poulakis |
| 8,925,263 B2 | 1/2015 | Haddock et al. |

(56) References Cited

U.S. PATENT DOCUMENTS

| | | |
|---|---|---|
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 * | 4/2015 | Liu .................. F24S 25/615 403/381 |
| 9,052,123 B2 | 6/2015 | Anderson et al. |
| 9,065,191 B2 | 6/2015 | Martin et al. |
| 9,076,899 B2 | 7/2015 | Schrock |
| 9,085,900 B2 | 7/2015 | Haddock |
| 9,086,185 B2 * | 7/2015 | Haddock ................ E04D 13/10 |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,166,524 B2 | 10/2015 | West et al. |
| 9,175,878 B2 | 11/2015 | Kemmer et al. |
| 9,194,130 B1 | 11/2015 | Stanley |
| 9,194,613 B2 | 11/2015 | Nuernberger et al. |
| 9,200,456 B2 | 12/2015 | Murphy |
| 9,222,263 B2 | 12/2015 | Haddock |
| 9,223,907 B2 | 12/2015 | Chanin et al. |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,447,988 B2 | 9/2016 | Stearns et al. |
| 9,473,066 B2 | 10/2016 | Stehan et al. |
| 9,479,110 B2 | 10/2016 | Patton et al. |
| 9,496,697 B1 | 11/2016 | Wentworth |
| 9,530,916 B2 | 12/2016 | Haddock et al. |
| 9,534,390 B2 | 1/2017 | Pendley et al. |
| 9,599,280 B2 | 3/2017 | West et al. |
| 9,608,559 B2 | 3/2017 | Haddock et al. |
| 9,611,652 B2 | 4/2017 | Haddock et al. |
| 9,647,433 B2 | 5/2017 | Meine |
| 9,647,607 B2 | 5/2017 | Patton et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,819,303 B2 | 11/2017 | Ash |
| 9,831,817 B2 | 11/2017 | Rothschild |
| 9,845,584 B1 | 12/2017 | Goldammer |
| 9,850,661 B2 * | 12/2017 | Kovacs ................ E04D 13/10 |
| 9,853,593 B2 | 12/2017 | Cinnamon et al. |
| 9,865,938 B2 | 1/2018 | Meine et al. |
| 9,876,463 B2 | 1/2018 | Jasmin |
| 9,893,676 B2 | 2/2018 | Anderson et al. |
| 9,893,677 B1 | 2/2018 | Liu |
| 9,920,958 B2 | 3/2018 | Haddock et al. |
| 9,926,706 B2 | 3/2018 | Hockman |
| 9,966,745 B2 | 5/2018 | Wentworth |
| 9,985,361 B2 | 5/2018 | Martin |
| 9,985,575 B2 | 5/2018 | Stearns et al. |
| 10,036,414 B2 | 7/2018 | Wiley et al. |
| 10,036,576 B1 | 7/2018 | Robinson |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |
| 10,186,791 B2 | 1/2019 | Meine et al. |
| 10,202,991 B2 | 2/2019 | Lewis |
| 10,205,418 B2 | 2/2019 | Nayar |
| 10,211,773 B2 | 2/2019 | Jasmin et al. |
| 10,211,775 B1 | 2/2019 | Wentworth et al. |
| 10,218,305 B1 | 2/2019 | Schrock |
| 10,240,820 B2 | 3/2019 | Ash et al. |
| 10,291,176 B2 | 5/2019 | Wentworth et al. |
| 10,312,855 B2 | 6/2019 | Lester et al. |
| 10,337,764 B2 | 7/2019 | Ash et al. |
| 10,359,069 B2 | 7/2019 | Ash et al. |
| 10,385,573 B2 * | 8/2019 | Van Leuven .......... E01H 5/102 |
| 10,443,896 B2 | 10/2019 | Haddock et al. |
| 10,454,190 B1 | 10/2019 | Martin |
| 10,472,828 B2 | 11/2019 | Stearns et al. |
| 10,502,457 B2 | 12/2019 | Haddock et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,594,251 B2 | 3/2020 | Stearns et al. |
| 10,622,935 B1 | 4/2020 | Liu |
| 10,634,175 B2 | 4/2020 | Haddock |
| 10,640,980 B2 | 5/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,731,355 B2 | 8/2020 | Haddock et al. |
| 10,749,459 B1 | 8/2020 | Liu et al. |
| 10,749,466 B2 | 8/2020 | Smeja |
| 10,763,777 B2 | 9/2020 | Stearns et al. |
| 10,797,634 B1 | 10/2020 | Jasmin et al. |
| 10,816,240 B2 | 10/2020 | Robinson |
| 10,837,476 B2 | 11/2020 | Lewis |
| 10,851,826 B2 | 12/2020 | Ash et al. |
| 10,859,292 B2 | 12/2020 | Haddock et al. |
| 10,868,491 B2 | 12/2020 | Wentworth et al. |
| 10,903,785 B2 | 1/2021 | Haddock et al. |
| D909,853 S | 2/2021 | Jasmin |
| 10,931,225 B2 | 2/2021 | Yang et al. |
| 10,948,002 B2 | 3/2021 | Haddock |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,035,126 B2 | 6/2021 | Haddock et al. |
| 11,041,310 B1 | 6/2021 | Haddock et al. |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,368,005 B2 | 6/2022 | Meine et al. |
| 11,552,591 B2 | 1/2023 | Jasmin et al. |
| 11,575,343 B2 | 2/2023 | Wentworth et al. |
| D983,015 S | 4/2023 | Jasmin et al. |
| D983,016 S | 4/2023 | Jasmin et al. |
| D983,017 S | 4/2023 | Jasmin et al. |
| D983,018 S | 4/2023 | Jasmin et al. |
| D983,019 S | 4/2023 | Jasmin et al. |
| 11,621,665 B2 | 4/2023 | Jasmin et al. |
| 2002/0026765 A1 | 3/2002 | Vahey |
| 2002/0088196 A1 | 7/2002 | Haddock |
| 2002/0160635 A1 | 10/2002 | Kurrer et al. |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |

(56) References Cited

U.S. PATENT DOCUMENTS

| | | |
|---|---|---|
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamlp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1* | 6/2010 | London ............... E04G 21/3261 182/3 |
| 2010/0154784 A1 | 6/2010 | King et al. |
| 2010/0162641 A1 | 7/2010 | Reyal et al. |
| 2010/0171016 A1* | 7/2010 | Haddock ................. E04D 13/10 248/237 |
| 2010/0175738 A1 | 7/2010 | Huss et al. |
| 2010/0192505 A1 | 8/2010 | Schaefer et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1* | 9/2011 | London ................... E04G 21/32 52/745.21 |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1 | 4/2013 | Stanley |
| 2013/0118545 A1 | 5/2013 | Bosler et al. |
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |
| 2013/0263917 A1 | 10/2013 | Hamamura |
| 2013/0313043 A1 | 11/2013 | Lallier |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0338273 A1 | 11/2014 | Stapleton |
| 2014/0341645 A1 | 11/2014 | Liu et al. |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2016/0025262 A1 | 1/2016 | Stearns et al. |
| 2016/0049901 A1 | 2/2016 | Muther et al. |
| 2016/0060869 A1* | 3/2016 | Smeja ....................... E04B 1/40 52/701 |
| 2016/0087576 A1 | 3/2016 | Johansen et al. |
| 2016/0111835 A1 | 4/2016 | Nayar |
| 2016/0111997 A1 | 4/2016 | Ganshaw et al. |
| 2016/0111998 A1 | 4/2016 | Schmid |
| 2016/0130815 A1 | 5/2016 | Menegoli |
| 2016/0160524 A1* | 6/2016 | Malins ..................... F16B 2/065 248/217.4 |
| 2016/0176105 A1 | 6/2016 | Stanley |
| 2016/0177984 A1 | 6/2016 | Kovacs et al. |
| 2016/0268958 A1 | 9/2016 | Wildes et al. |
| 2017/0040928 A1 | 2/2017 | Schuit et al. |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302221 A1 | 10/2017 | Jasmin |
| 2017/0336021 A1 | 11/2017 | Anderson |
| 2018/0013382 A1 | 1/2018 | Smeja |
| 2018/0167026 A1 | 6/2018 | Xie |
| 2019/0013772 A1 | 1/2019 | Bamat et al. |
| 2019/0049151 A1 | 2/2019 | Harris et al. |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0178274 A1 | 6/2019 | Katz |
| 2019/0195252 A1 | 6/2019 | Pryor et al. |
| 2019/0226214 A1 | 7/2019 | Van Leuven |
| 2019/0273460 A1* | 9/2019 | Kovacs ................... H02S 20/23 |
| 2019/0285224 A1 | 9/2019 | McKechnie et al. |
| 2019/0330853 A1 | 10/2019 | Van Leuven |
| 2019/0343085 A1 | 11/2019 | Donado |

(56) References Cited

U.S. PATENT DOCUMENTS

| | | | |
|---|---|---|---|
| 2019/0345719 | A1 | 11/2019 | Header |
| 2019/0363667 | A1 | 11/2019 | Braunstein et al. |
| 2019/0372501 | A1 | 12/2019 | Wada et al. |
| 2020/0144959 | A1 | 5/2020 | Stearns et al. |
| 2020/0208658 | A1 | 7/2020 | Roman |
| 2020/0217339 | A1 | 7/2020 | Haddock |
| 2020/0252023 | A1 | 8/2020 | Stearns et al. |
| 2020/0263432 | A1 | 8/2020 | Haddock |
| 2020/0313604 | A1 | 10/2020 | Harris et al. |
| 2020/0313611 | A1 | 10/2020 | Ash et al. |
| 2020/0318349 | A1 | 10/2020 | Stearns et al. |
| 2020/0321763 | A1 | 10/2020 | Joshi et al. |
| 2020/0340712 | A1 | 10/2020 | Leitch et al. |
| 2020/0362632 | A1 | 11/2020 | Fort |
| 2021/0005115 | A1 | 1/2021 | Johnson |
| 2021/0028741 | A1 | 1/2021 | Stearns et al. |
| 2021/0067085 | A1 | 3/2021 | Stearns et al. |
| 2021/0079947 | A1 | 3/2021 | Ash et al. |
| 2021/0104973 | A1 | 4/2021 | Stearns et al. |
| 2021/0111546 | A1 | 4/2021 | Varale |
| 2021/0140681 | A1 | 5/2021 | Haddock et al. |
| 2021/0143771 | A1 | 5/2021 | Haddock et al. |
| 2021/0159843 | A1 | 5/2021 | Stearns et al. |
| 2021/0167720 | A1 | 6/2021 | Stearns et al. |
| 2021/0184626 | A1 | 6/2021 | Yang et al. |
| 2021/0194157 | A1 | 6/2021 | Ash et al. |
| 2021/0194158 | A1 | 6/2021 | Ash et al. |
| 2021/0199141 | A1 | 7/2021 | Haddock |
| 2021/0265940 | A1 | 8/2021 | Stearns et al. |
| 2021/0376781 | A1 | 12/2021 | Stearns et al. |
| 2021/0376782 | A1 | 12/2021 | Stearns et al. |
| 2021/0388618 | A1 | 12/2021 | Stearns et al. |
| 2022/0140771 | A1 | 5/2022 | Stearns et al. |
| 2022/0145634 | A1 | 5/2022 | Stearns et al. |
| 2022/0149545 | A1 | 5/2022 | Ash et al. |
| 2022/0178586 | A1 | 6/2022 | Ash et al. |
| 2022/0275813 | A1 | 9/2022 | Haddock |
| 2022/0278516 | A1 | 9/2022 | Meine et al. |
| 2022/0298795 | A1 | 9/2022 | Haddock et al. |
| 2023/0036926 | A1 | 2/2023 | Jovanovic et al. |

FOREIGN PATENT DOCUMENTS

| | | |
|---|---|---|
| AT | 298762 | 5/1972 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CH | 204783 | 5/1939 |
| CH | 388590 | 2/1965 |
| CH | 469159 | 2/1969 |
| CH | 671063 | 7/1989 |
| CN | 202025767 | 11/2011 |
| CN | 202577780 | 12/2012 |
| CN | 103774795 | 5/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108105222 | 6/2018 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| DE | 202013002857 | 5/2013 |
| DE | 202015102936 | 9/2016 |
| DE | 202012013476 | 2/2017 |
| EP | 0481905 | 4/1992 |
| EP | 0722023 | 7/1996 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2746695 | 6/2014 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2971577 | 8/2012 |
| FR | 2997169 | 4/2014 |
| FR | 3074369 | 12/2019 |
| GB | 2149829 | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-097291 | 4/2006 |
| JP | 2009-052278 | 3/2009 |
| JP | 2009-179955 | 8/2009 |

(56) References Cited

FOREIGN PATENT DOCUMENTS

| | | |
|---|---|---|
| JP | 2009-185599 | 8/2009 |
| JP | 2011-069130 | 4/2011 |
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |

OTHER PUBLICATIONS

"Aluminum," Wikipedia, Jul. 3, 2016, 21 pages [retrieved Oct. 3, 2017 from: en.wikipedia.org/wIki/Aluminium].
"ClampFit-H Product Sheet," Schletter GmbH, Kirchdorf, Germany, Nov. 2015, 2 pages.
IDEEMATEC Tracking & Mounting Systems [online], Apr. 2008, [retrieved Mar. 6, 2012], Retrieved from http://www.ideematec.de.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system'", Arrid, 2008, 34 pages [retrieved online from: https://web.archive.org/web/20120317120735/www.arrid.com.au/?act=racking_parts].

"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"REES-Snow Retention Systems," Weerbewind, 2010, 3 pages [retrieved online from: https://web.archive.org/web/20100310075027/www.rees-oberstdorf.de/en/products/snow-retention-system.html].
"S-5! WindClamp™ Install," Metal Roof Innovations, Ltd., 2014, 1 page.
"Solar mount. System," Schletter GmbH, 2012, 1 page [retrieved online from: https://web.archive.org/web/20120316154604/www.schletter.de/152-1-Solar-mounting-systems.html].
"Wiley Grounding & Bonding Solutions," Hubbell, 2020, 2 pages [retrieved online from: www.hubbell.com/wiley/en/grounding-and-bonding].
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from A (Aluminum) to Z (Zinc)—Part II, Nov./Dec. 2001, 8 pages.
Official Action for U.S. Appl. No. 16/821,885, dated Nov. 10, 2020 14 pages.
Notice of Allowance for U.S. Appl. No. 16/821,885, dated Feb. 18, 2021 7 pages.
"Ace Clamp Cut Sheet | 5031 Z1-2," Ace Clamp, Nov. 2018, 1 page.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
International Search Report and Written Opinion for International (PCT) Patent Application No. PCT/US21/22466, dated Jun. 3, 2021 13 pages.
"Aerocompact® Compactmetal TR Checklist," Aerocompact, Aug. 30, 2021, CL TR Eng EU V1, 2 pages [retrieved online from: cdn.intelligencebank.com/eu/share/8MnR/YJMd/ZBPL4/original/AEROCOMPACT_CL_TR_Eng_V1_WEB].
"Aerocompact® Compactmetal TR," Aerocompact, Sep. 2, 2021, PB TR ENG EU V1, 3 pages [retrieved online from: cdn.intelligencebank.com/eu/share/8MnR/qMBXP/VYrWa/original/AEROCOMPACT_Leaflet_TR_ENG_V1_WEB].
"CompactMETAL TR59 | TR74 Assembly Instructions," Aerocompact, Sep. 2021, 27 pages.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
U.S. Appl. No. 17/745,528, filed May 15, 2022.
U.S. Appl. No. 17/833,252, filed Jun. 6, 2022.
U.S. Appl. No. 29/845,330, filed Jul. 6, 2022.
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/product/ez-grip-metal-deck-mount/#].
"Fix2000 check list," Schletter GmbH, last updated Jul. 2010, 1 page.
"Metal Roof Deck Mount Kit," SunModo Corp., Oct. 16, 2018, Product Drawing, 1 page.
"Slot definition," Merriam-Webster Dictionary, 2022, 1 page [retrieved online Aug. 24, 2022 from www.merriam-webster.com/dictionary/slot].
"Standing Seam Rail Free One Sheet," SunModo, Corp., 2020, 2 pages.

(56) References Cited

OTHER PUBLICATIONS

"Standing Seam RiverClack Clamp," Shanghai Woqin New Energy Technology Co., LTD., 2018, 4 pages [retrieved online on Mar. 23, 2022 from: www.wochnmount.com/Details.html?product_id=36].
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006, 14 pages.
International Preliminary Report on Patentability for International (PCT) Patent Application No. PCT/US21/22466, dated Sep. 29, 2022 8 pages.
"Code: The SR-EC-010," Lockseam Ltd., 2018, Datasheet SR-EC-010 Version 2.0, 6 pages.
"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Non-Penetrative Clamps with Roofs," Clenergy, Dec. 2021, Datasheet, 5 pages.
"PV-ezRack Klip-lok Interface," Clenergy, 2020, 1 page.
"PV-ezRack SolarRoof-Black Anodized," Clenergy, 2020, 4 pages.
"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.

\* cited by examiner

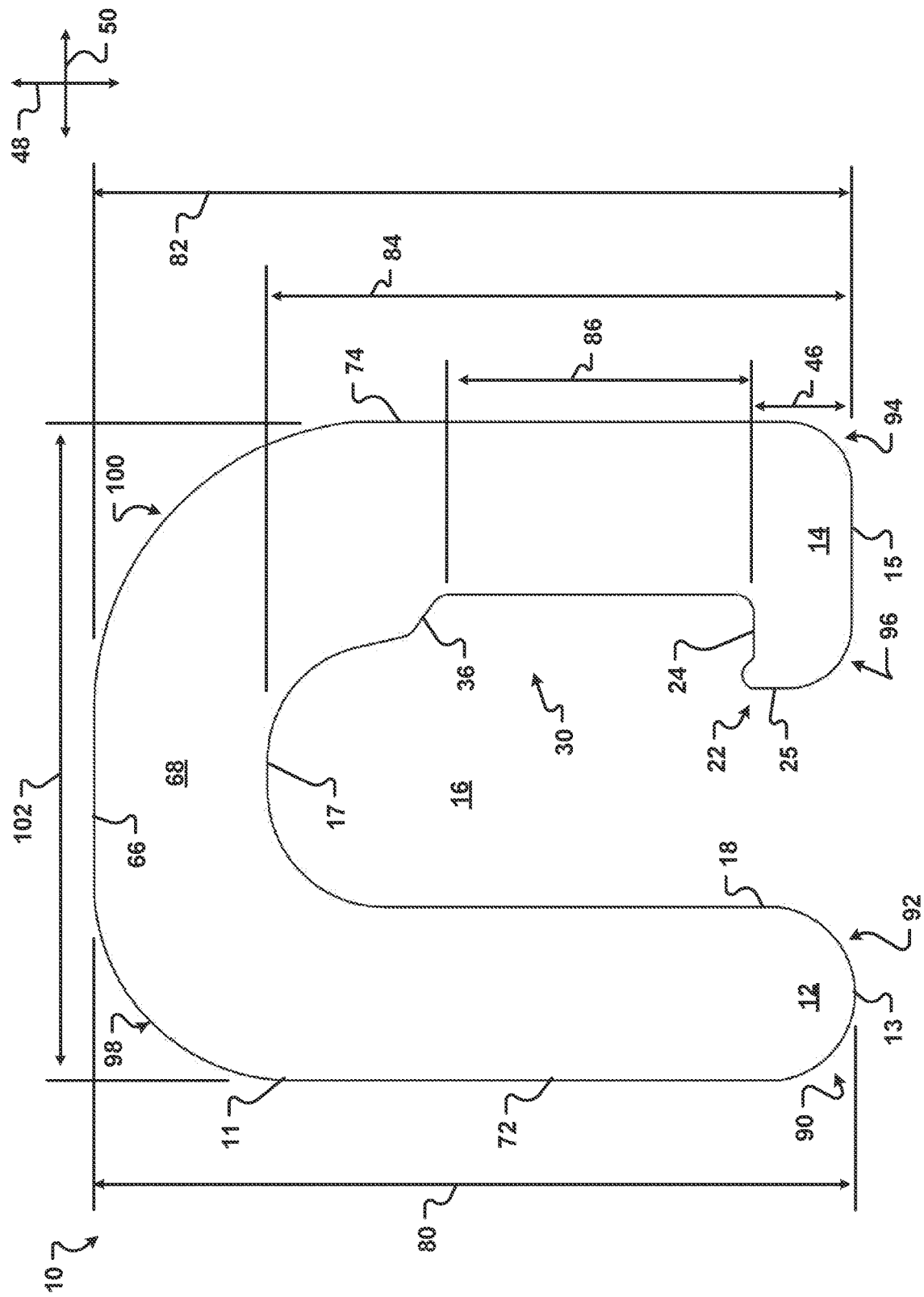

MOUNTING DEVICE FOR CONTROLLING UPLIFT OF A METAL ROOF

CROSS REFERENCE TO RELATED APPLICATIONS

This application is a continuation of U.S. patent application Ser. No. 16/821,885, filed on Mar. 17, 2020, and entitled "Mounting Device for Controlling Uplift of a Metal Roof", now U.S. Pat. No. 11,041,310, issued on Jun. 22, 2021, which application is incorporated herein by reference in its entirety.

FIELD OF THE DISCLOSURE

The present disclosure generally relates to an apparatus for controlling uplift of a metal roof and, more specifically, to a clamp positionable on and securable to a roof joint between two panels of a metal roof to support and maintain the integrity of the roof joint.

BACKGROUND

Metal roofs can be formed by connecting multiple panels together where the edges of adjacent metal panels are interconnected in a manner that defines a roof joint or a standing seam. In some configurations, the edges are folded one or more times to form the standing seam. However, this type of roof is susceptible to uplift and tearing of the panels due to external forces such as wind. During particularly windy conditions, panels can detach or tear from the roof and injure passers-by or damage property. Moreover, the standing seam between two metal panels can unravel and separate. With the increased use of metal roofs in building construction, there is an increased need to control the uplift of such panels in these types of roofs and to prevent unravelling and separation of standing seams.

U.S. Pat. No. 5,222,340 ("the '340 Patent"), which is incorporated by reference in its entirety, discloses a device for increasing uplift resistance of metal standing seam roofs. The device disclosed in the '340 Patent includes a first elongate part having a head, a longitudinal recess beneath the head, a foot extending below the recess and a hole laterally extending therethrough, a second elongate part having a hole laterally extending therethrough and a mating surface opposing the recess and mating surface of the first elongate part, and a fastener for drawing the first and second elongate parts together, to confine the roof seam in the recess. However, securing the device of the '340 Patent to raised portions and standing seams on a roof is time consuming as the first and second elongate parts must both be positioned about the raised seam such that the holes extending laterally through the first and second elongate parts are aligned. Once aligned, the fastener may be inserted through the holes in order to draw the first and second elongate parts together to confine the raised portion within the recess of the first elongate part. In this regard, assembling a number of the devices of the '340 Patent on a metal roof is a time and labor-intensive task, which results in increased costs. In addition, the fastener is a single, potential point of failure for the device, and the raised portion of the roof is simply confined in the device, such that the device can be pulled off of the raised portion or rattled loose from the raised portion more easily.

U.S. Pat. Nos. 97,316; 106,580; 250,580; 756,884; 42,992; 459,876; 602,983; 4,141,182; 5,152,107; and 5,715,640 ("the '640 Patent"), which are incorporated by reference in their entireties, generally disclose snow guards for retaining snow and ice, brackets and braces for mounting other components, and clamps for securing roof panels together. There are a number of problems associated with the snow guard devices described above. Such devices may cause the roof to leak since many of the devices described above are attached to the roof by a screw, nail, or other fastener which pierces the roofing surface. Piercing the roof can lead to undesired leakage due to inadequate sealing or shearing of the fastener by the forces exerted thereon by sliding snow and/or ice. In an attempt to prevent leakage, sealants, and/or gaskets are often applied around the holes pierced through the roofing surface. However, these measures complicate installation and may not fully prevent leaks. Alternative methods for the attachment of snow guard devices to roofs, such as adhesive bonding, may fail to provide secure attachment and/or may be difficult to install on a sloped surface, particularly where the device is applied to a smooth, non-porous roofing material such as metal. The types of snow guard devices are also generally not readily adaptable for use in a broad range of raised seam roofing applications. Some of the devices described above are not intended for standing seam roofing applications at all but, rather, are primarily for use on shingled or other non-raised seam roofs.

Next, the '640 Patent describes a clamp that secures two metal roof panels together to control uplift. The clamp described in the '640 Patent has a simple channel or slot for receiving a roof joint, which makes the clamp in the '640 Patent vulnerable to being pulled off from the roof joint by an external force or jostled loose. Moreover, the simple channel or slot does not locate a clamp in a particular position relative to the roof joint. As a result, a misaligned clamp can damage the roof joint or be easily pulled off of or jostled from the roof. In addition, a component such as a bracket that spans multiple clamps can be rendered inoperative due to having one or more clamps misaligned relative to the roof SUMMARY The present disclosure is directed to a clamp that has features such as arms, a channel, and a protrusion to better secure and locate a roof joint within a slot of the clamp. A roof joint between two panels can be a seamed joint that is folded upon itself at least once. As a result, the roof joint extends laterally or horizontally over one of the panels. The roof joint can be positioned in the slot of the clamp and then pressed into the channel of the clamp. The channel defines one or more protrusions that secure the roof joint in a predetermined position relative to the clamp. Once in the predetermined position, a bar component (such as a set screw or seam fastener) can secure the roof joint in the clamp, and the clamped roof joint helps the roof resist uplift. The clamp is configured to be simple to manufacture to reduce costs. In some embodiments, the clamp has a one-piece, unitary body.

According to at least some embodiments of the present disclosure, a third arm of the clamp extends into a slot in the clamp to retain a roof joint within the clamp in a vertical direction. The slot extends vertically between a first arm and a second arm of the clamp, and the third arm extends generally horizontally from one of the first and second arms and into the slot. During operation, the roof joint is positioned in the slot and then over the third arm. More specifically, a bottom or lower portion of the roof joint is positioned above a distal or free end of the third arm. A bar component can extend into the slot into engagement with a sidewall of the roof joint. As the bar component is advanced against the sidewall, the roof joint is pressed above the third arm. In this manner, the bar component keeps the roof joint over the third arm, and thus, the third arm prevents the clamp from being pulled off of the roof joint in the vertical direction. Accordingly, the clamp maintains and provides support to the mechanical fold of the roof joint to improve the durability of the standing seam roof.

According to at least some embodiments of the present disclosure, a clamp is provided with at least one protrusion that retains and locates a roof joint in a specific position relative to the clamp. A channel can extend into one or more arms of the clamp to define an upper or a first protrusion and a lower or a second protrusion. The first protrusion can secure a top end of the roof joint to prevent vertical movement of the roof joint relative to the clamp. In one configuration, the first protrusion engages at lateral portion of a seam defining the roof joint. Additionally, or alternatively, the first protrusion may engage the top end of the roof joint. Similarly, the lower or second protrusion can secure a lower end of the roof joint to prevent horizontal movement of the clamp relative to the roof joint. For example, in one configuration the second protrusion can extend at least partially between the lower end of the roof joint and a vertical portion of a metal panel of the roof joint. The relationship between the ends of the roof joint and the protrusions also holds or locates the clamp and the roof joint relative to each other to ensure that the bar component secures the roof joint within or against the clamp consistently and properly.

According to at least some embodiments of the present disclosure, an aperture and a cavity are provided in the clamp where a bar component extending through the aperture can deform part of a roof joint into the cavity. In various embodiments, the aperture extends through one arm of the clamp and a cavity extends into an inner surface of another arm of the clamp. When the roof joint is positioned in the channel and secured by at least one protrusion, a bar component (such as a set screw or a bolt) can extend through the aperture in one arm and contact and/or deform the roof joint at least partially into the cavity to secure the clamp to the roof joint. Optionally, the clamp may have only one aperture to receive the bar component.

According to at least some embodiments of the present disclosure, a second arm of a clamp has a greater thickness than a first arm to better center the clamp over a roof joint. The bar component extends through the first arm and drives the roof joint against an inner surface of the second arm. With the thickness of the second arm greater than the thickness of the opposing, first arm, the roof joint is closer to the center of the clamp (or a center of the slot of the clamp) than if the second arm had the same thickness as the first arm, in which case the roof joint would be further off center. When the clamp is centered over the roof joint, the weight of the clamp is also centered on the roof joint which may improve the ability of the clamp to resist force received from wind without inadvertent or unintended movement. Further, the roof joint will be closer to the first arm when the roof joint is approximately centered in the slot compared to a distance between the first arm and the roof joint if the roof joint is not centered in the slot. Because the roof joint is closer to the first arm, the distance that the bar component must be advanced through the aperture of the first arm to engage a sidewall of the roof joint is reduced. Accordingly, the bar component can have a length that is shorter compared to if the clamp is not configured to center the roof joint in the slot. This configuration may beneficially prevent unintended or inadvertent movement of the clamp relative to the roof joint, such as tipping of the clamp. Moreover, because the roof joint is closer to the first arm, the portion of the bar component extending from the first arm into the slot to contact the roof joint is decreased. This is beneficial as it reduces the likelihood that the portion of the bar component extending from the first arm will bend, fracture or break.

One embodiment of the present disclosure is a clamp system to support a roof joint formed by a first panel joined to a second panel, comprising: a clamp having a body with a first arm and a second arm; a slot extending into the body between a first inner surface of the first arm and a second inner surface of the second arm; a channel extending into the second inner surface of the second arm, the channel being offset from a free end of the second arm by a predetermined distance, the channel configured to receive at least a portion of the roof joint; an aperture extending through the first arm; and a bar component that extends through the aperture and into engagement with the roof joint to secure the clamp to the first and second panels. In some embodiments, the first panel and the second panel are joined together at seamed portions to form the roof joint.

Optionally, the bar component can be self tapping. Accordingly, the aperture extending through the first arm may initially be unthreaded prior to first advancing the bar component through the aperture. The unthreaded aperture reduces operations required to manufacture the clamp and beneficially reduces the cost of producing the clamp.

Alternatively, in various embodiments, the aperture has a threaded inner surface, and the bar component has a threaded outer surface that engages the threaded inner surface of the aperture. Optionally, the bar component can be a set screw or a seam fastener.

In one configuration, the bar component has a rounded or a blunt-nosed distal end to provide a desirable interface with a generally vertical sidewall of the roof joint. In this manner, the bar component will not penetrate the roof joint or the first and second panels. Moreover, the rounded distal end may prevent scratching the roof joint or damaging a coating on the roof joint.

In some embodiments, the bar component deforms the roof joint to secure the clamp to the first and second panels. More specifically, as the bar component is advanced through the aperture into engagement with the sidewall of the roof joint, an opposing side of the roof joint may be pressed into the channel. In some configurations, the roof joint is squeezed into a narrower configuration and/or bent due to the compressive force applied by the bar component and the second inner surface of the second arm.

In various embodiments, the system further comprises a third arm extending from the free end of the second arm into the slot and generally toward the first arm. Optionally, the channel extends into a third inner surface of the third arm.

In some embodiments, the channel defines a first protrusion on the second arm. The first protrusion has a geometry to engage a portion of the roof joint. In one configuration, the first protrusion may engage a sidewall of the roof joint. Additionally, or alternatively, the first protrusion may be positioned proximate to and engage a top end of the roof joint.

The channel may optionally define a second protrusion on the third arm. The second protrusion is configured to retain a bottom portion of the roof joint. For example, the second protrusion may extend between the bottom portion of the roof joint and a vertical portion of the second panel of the roof joint. In this manner, the bottom portion of the roof joint may be positioned proximate to the third inner surface of the third arm and between the second protrusion and the second inner surface of the second arm.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

Unless otherwise indicated, all numbers expressing quantities, dimensions, conditions, ratios, ranges, and so forth used in the disclosure and claims are to be understood as being modified in all instances by the term "about" or "approximately". Accordingly, unless otherwise indicated, all numbers expressing quantities, dimensions, conditions, ratios, ranges, and so forth used in the disclosure and claims may be increased or decreased by approximately 5% to achieve satisfactory results. In addition, all ranges described herein may be reduced to any subrange or portion of the range.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE FIGURES

The accompanying drawings are incorporated into and form a part of the specification to illustrate several examples of the present disclosure. The drawings are not to be construed as limiting the disclosure to only the illustrated and described examples.

FIG. 9 is still another end view of the clamp of FIG. 1.

DETAILED DESCRIPTION

Before any embodiments of the disclosure are explained in detail, it is to be understood that the disclosure is not limited in its application to the details of construction and the arrangement of components set forth in the following description or illustrated in the figures. The disclosure is capable of other embodiments and of being practiced or of being carried out in various ways. As will be appreciated, other embodiments are possible using, alone or in combination, one or more of the features set forth above or described below. For example, it is contemplated that various features and devices shown and/or described with respect to one embodiment or figure may be combined with or substituted for features or devices of other embodiments or figures regardless of whether or not such a combination or substitution is specifically shown or described herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure. The use of "mounting device" and "clamp" can be interchangeable herein.

Figure 1:
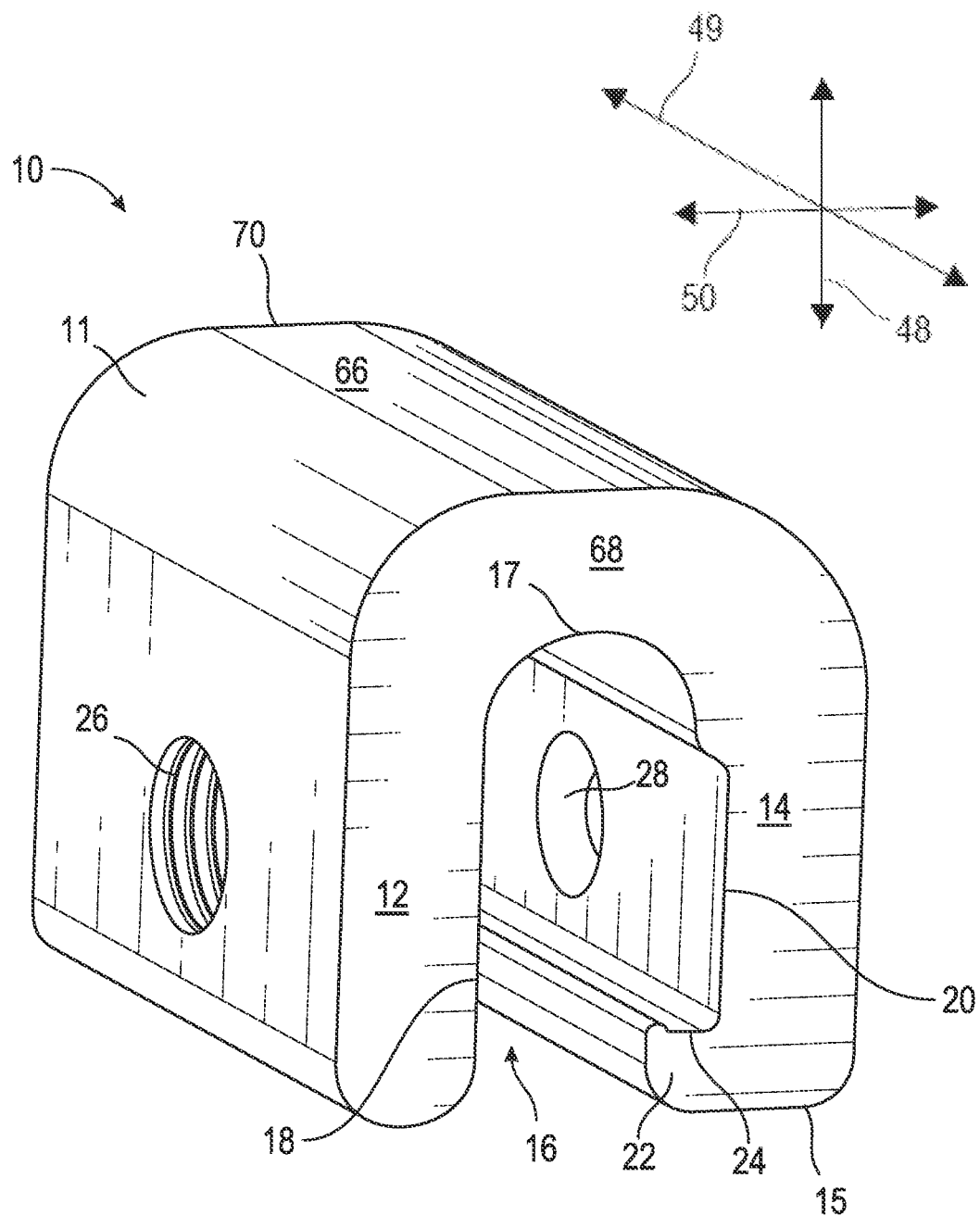
FIG. 1 is a perspective view of a clamp according to embodiments of the present disclosure.

Referring to FIG. 1, a perspective view of a clamp 10 is provided. The clamp 10 in this embodiment has a first arm 12 and a second arm 14 that extend downwardly from a top portion 66 of the clamp body 11. The clamp 10 can be described as having arms 12, 14 that are joined together, or alternatively, as having a top portion 66 that joins the arms 12, 14 together. Optionally, the top portion 66 is generally planar. However, in other embodiments, the top portion 66 may be rounded or curved.

A slot 16 extends upwardly into the clamp 10, and the slot 16 is generally positioned between a first inner surface 18 of the first arm 12 and a second inner surface 20 of the second arm 14. The slot 16 includes an upper portion or slot base 17 that joins the first and second inner surfaces. In one configuration the slot base 17 has a curved or arcuate shape. For example, the slot base 17 may be curved as generally illustrated in FIG. 1. In one embodiment, the slot base 17 has a first radius of curvature of about 0.18 inches proximate to the first inner surface 18. Similarly, the slot base can have a second radius of curvature proximate to the second inner surface 20 of about 0.18 inches. However, other shapes of the slot base 17 are contemplated. In another configuration, the slot base may be generally linear such that a corner is formed between the slot base and one or more of the first and second inner surfaces 18, 20.

As generally shown in FIG. 1 and other figures herein, in some configurations the slot 16 extends completely along a length of the clamp 10 from a first end 68 to a second end 70 of the clamp. The length dimension of the slot 16 coincides with the spacing between the ends 68, 70 of the clamp and is generally parallel to a longitudinal axis 49. When the slot 16 extends through both clamp ends 68, 70, the clamp 10 and the slot 16 can be positioned at any point along a roof joint 56. However, it will be appreciated that, for example, the slot 16 can extend only partially through the clamp from a first end 68 but not entirely through the clamp 10 to a second end 70. In this embodiment, the clamp 10 and the slot 16 may be secured onto an end of a roof joint where the roof joint extends into an open end of the slot 16, moves horizontally within the slot 16, and then contacts an opposing closed end of the slot 16.

Further, the slot 16 is shown as having a constant cross-sectional shape from the first end 68 to the opposing second end 70. It will be appreciated that the slot 16 can have a varying or disjointed shape as the slot 16 extends from one end 68 to the opposing end 70.

The clamp 10 may optionally include a third arm 22 such as generally shown in FIG. 1. The third arm 22 may extend from a distal or free end 15 of the second arm 14 into the slot 16 and generally toward the first arm 12. More specifically, the third arm 22 extends at least generally in the direction that the second inner surface 20 of the second arm is spaced from the first inner surface 18 of the first arm. The third arm 22 also has a third inner surface 24.

In some embodiments, the third arm 22 extends from the second arm 14 at a point between the free end 15 and the base 17 of the slot 16. As described elsewhere herein, some embodiments of clamps 10 of the present disclosure may not have a third arm 22 at all. The third arm 22, as described in further detail below, can help secure a roof joint 56 within the slot 16. The third arm 22 can also provide an increased area of contact with one of the panels of the roof to resist movement of the clamp 10 relative to the roof.

Optionally, the third arm extends a distance from the second inner surface 20 of the second arm in a horizontal direction 50 which defines a length of the third arm. The length of the third arm may be at least about 0.14", or between about 0.05" and about 0.4". As may be appreciated, in some embodiments, the length of the third arm 22 affects the amount of surface area of the third arm 22 in contact with a surface of the roof, with a greater length providing increased surface area and greater resistance to relative movement between the clamp 10 and the roof.

Figure 2:
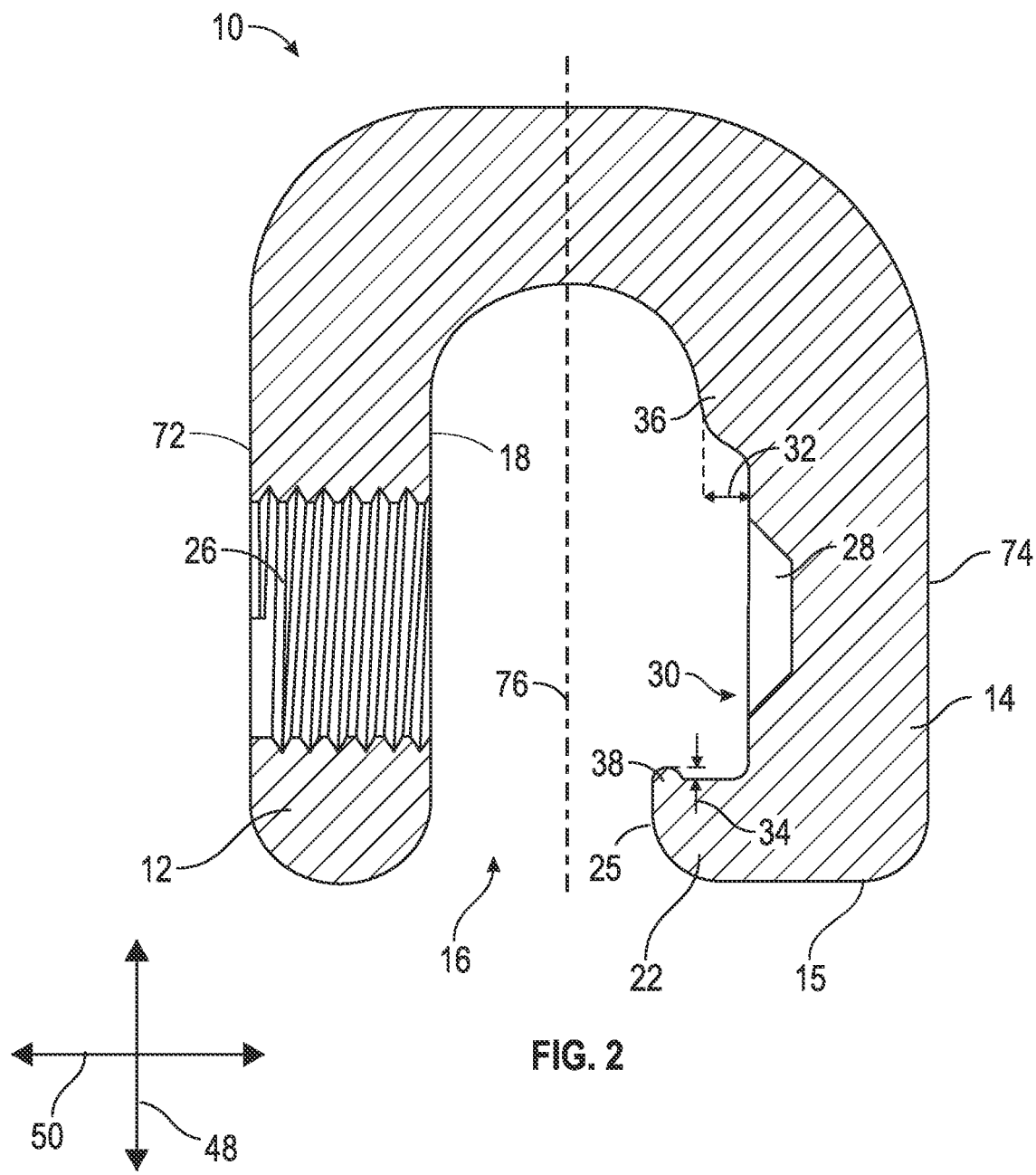
FIG. 2 is a cross-sectional elevation view of the clamp in FIG. 1 according to embodiments of the present disclosure.

Referring to FIG. 2, a cross-sectional elevation view of the clamp 10 in FIG. 1 is provided. In this view, an aperture 26 which extends through the first arm 12 is generally illustrated. Although the aperture 26 is illustrated with an internal thread, in other configurations the aperture is unthreaded to reduce manufacturing costs. A cavity 28 that extends into the inner surface 20 of the second arm 14 is also shown. In operation, when a roof joint 56 is positioned in the slot 16, a bar component 62, such as a set screw or a bolt illustrated in FIG. 4, can extend through the aperture 26 and into the slot 16 to secure the roof joint with the clamp 10.

Specifically, the bar component can extend into the slot 16 to a point where a distal end 64 of the bar component is a predetermined distance from the first inner surface 18 and engaged with the roof joint 56 to prevent the roof joint from being removed from the slot 16 of the clamp 10. The bar component extends into the slot 16 far enough to where the roof joint cannot pass the third arm 22 and move out of the slot 16. In some embodiment, the distal end 64 of the bar component 62 can engage a side surface 52B of the roof joint 56. For example, the bar component 62 may apply a force to the side surface 52B. However, the bar component 62 does not penetrate the roof joint 56 or either of the roof panels 52, 54. The is beneficial because a fastener or a bolt that penetrates a surface of the roof, such as one or more of the roof panels 52, 54, can cause leaks, corrosion of the material of the roof panels, and may void a warranty of the roof provided by the roofs manufacturer.

Similarly, the bar component 62 can extend into the slot 16 to contact the vertical portion 52B or sidewall 57 of the roof joint 56 and prevent the roof joint from being removed from the slot 16 of the clamp 10. Friction between the bar component and the roof joint can prevent or resist the clamp 10 from moving horizontally along the roof joint. A force from the bar component 62 may also alter the shape of (or deform) the roof joint 56. For example, the bar component may compress the roof joint improving the strength of the roof joint.

Further still, the bar component 62 can contact a generally planar portion of the vertical portion 52B of the roof joint 56 and deform at least a portion of the roof joint, including pressing part of the roof joint into the cavity 28. In this manner, the bar component and cavity interact to more securely hold the roof joint within the slot 16 of the clamp 10 and prevent vertical and horizontal movement of the clamp 10 relative to the roof joint. Specifically, with a portion of the roof joint 56 deformed into the cavity 28 of the clamp 10, the clamp 10 cannot be pulled off of the roof joint in the vertical direction 48. Moreover, the clamp 10 cannot slide along the length of the roof joint in the longitudinal direction 49.

The clamp 10 may also include a channel 30. The channel 30 extends into the second inner surface 20 of the second arm 14 by a first distance 32 and extends into the third arm 22 by a second distance 34. The channel 30 is offset from the slot base 17 to define a first protrusion 36 of the clamp on the second arm 14. Optionally, upper and lower ends of the first protrusion 36 have a curved or rounded shaped to avoid scratching a coating of the roof joint or otherwise damaging the roof joint. In one configuration, the upper end of the first protrusion has a first radius of curvature between the slot base 17 and the first protrusion 36 of about 0.03 inches. The lower end of the first protrusion can have a second radius of curvature of about 0.03 inches between the first protrusion 36 and the second inner surface 20.

Additionally, or alternatively, the channel 30 can be offset from a free end 25 of the third arm 22 to define a second protrusion 38 of the clamp on the third arm 22. The second protrusion 38 extends at least generally in the direction that the third arm 22 is spaced from the top portion 66 of the clamp 10. More specifically, in one embodiment the second protrusion 38 extends generally in the vertical direction 48 within the slot 16 and toward the top portion 66.

Figure 4:
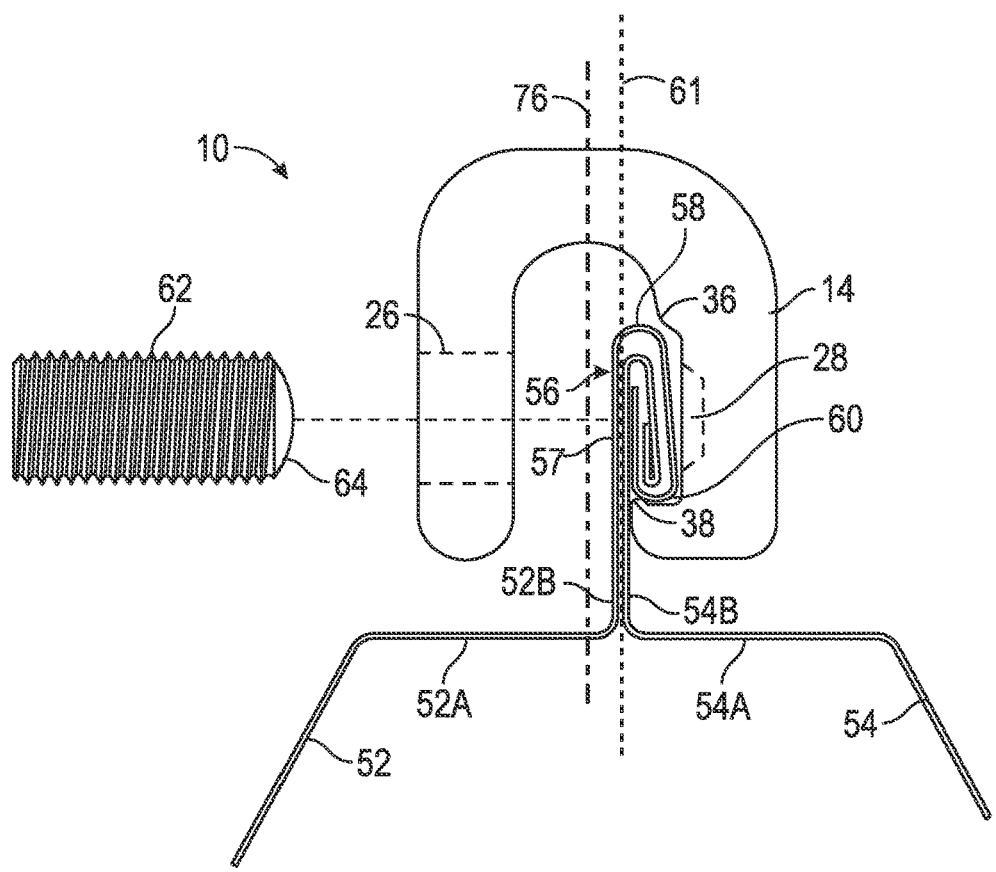
FIG. 4 is an end elevation view of a clamp of FIG. 1 relative to a roof joint formed by two roof panels, and a bar component according to embodiments of the present disclosure.

These first and second protrusions 36, 38 may help retain the roof joint 56 within the slot 16. More specifically, the first protrusion 36 engages the top or upper portion 58 of the roof joint, while the second protrusion 38 engages and, in some embodiments, may even extend into or between the folded portions of the roof joint 56. In one embodiment, the second protrusion 38 may extend between the vertical portion 54B of the second roof panel 54 and the bottom end 60 of the roof joint as generally illustrated in FIG. 4.

The first distance 32 may correspond to the length of the third arm 22, with the first distance 32 increasing as the length of the third arm 22 increases. As shown, the first distance 32 is greater than the second distance 34, but it will be appreciated that the distances 32, 34 can be equal. Alternatively, the second distance 34 can be greater than the first distance 32. Further, some embodiments of the clamp 10 do not have a third arm 22, and the channel 30 extends into the second arm 14. In these embodiments, the channel 30 can be offset from both the free end 15 of the second arm 14 and the slot base 17 to define two protrusions in the second arm 14 that retain the roof joint 56 in the slot 16.

Figure 3:
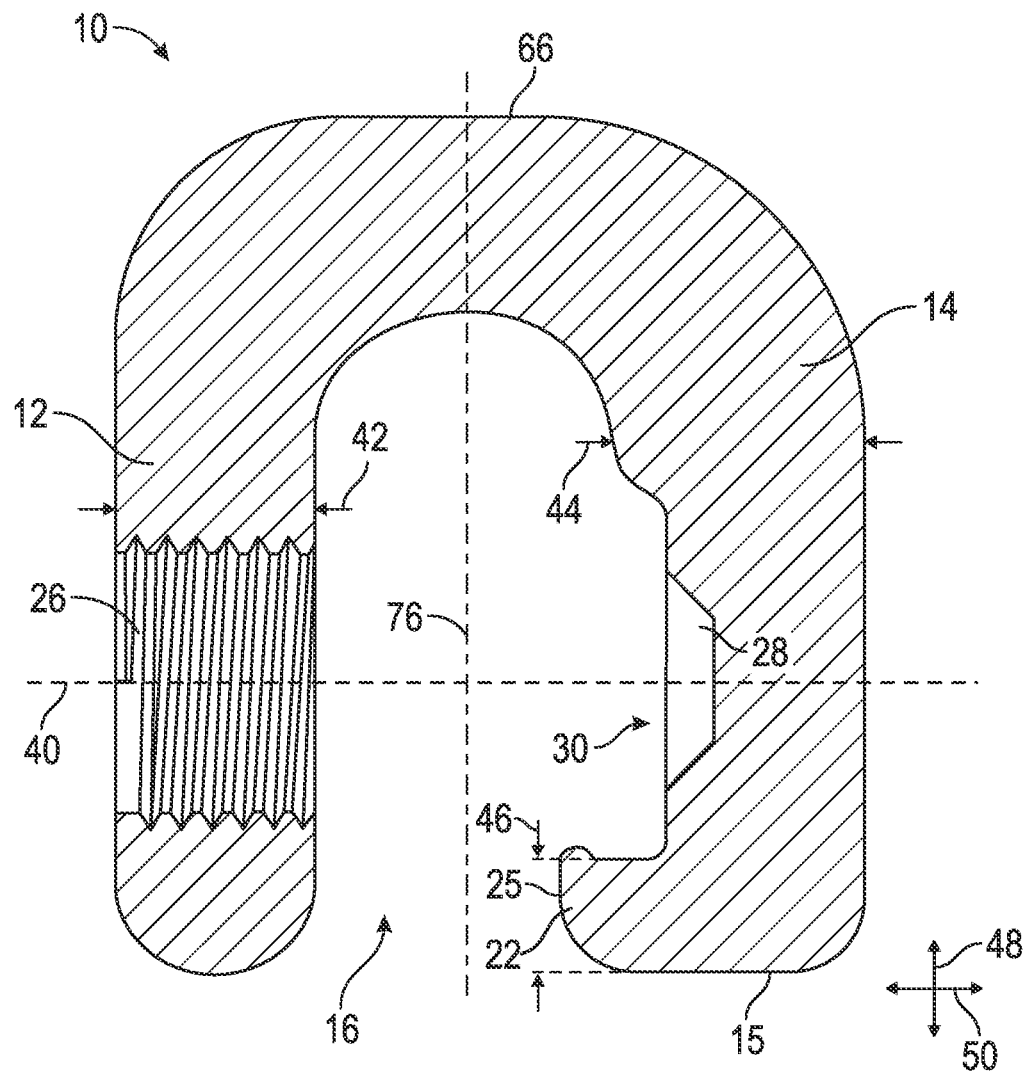
FIG. 3 is a further cross-sectional elevation view of the clamp in FIG. 1 according to embodiments of the present disclosure.

Referring now to FIG. 3, a further cross-sectional elevation view of the clamp 10 of FIG. 1 is provided. As shown, the aperture 26 extends through the first arm 12 along an axis 40. In one embodiment, the clamp 10 has only one aperture 26.

Optionally, the cavity 28 is generally centered on the axis 40 in one embodiment. Thus, a bar component 62 that extends through the aperture 26 is aligned with the cavity 28, and the bar component can deform part of the roof joint 56 into the cavity 28. The cavity 28 also extends into the second inner surface 20 of the second arm 14 where the channel 30 extends into the inner second surface of the second arm 14. Thus, the axis 40 can be described as extending through the channel 30. It will be appreciated that the aperture 26 and the cavity 28 may not be aligned on a common axis 40 in every embodiment of the present disclosure.

In one embodiment, the axis 40 is oriented approximately horizontally or generally parallel to the horizontal dimension 50. Accordingly, the aperture 26 is approximately perpendicular to an exterior surface of the first arm 12. In another configuration, the axis is approximately perpendicular to the first inner surface 18 and the second inner surface 20.

Alternatively, the axis 40 can be oriented obliquely to the horizontal dimension 50 For example, in one configuration, the axis 40 is not horizontal as it extends from the first inner surface toward the second inner surface.

Next, the thicknesses of the various arms are shown where the thicknesses are selected to better center the clamp 10 over an axis of a roof joint 56. Specifically, the first arm 12 has a first thickness 42, the second arm 14 has a second thickness 44, and the third arm 22 has a third thickness 46. In one embodiment, the second thickness 44 is larger than the first thickness 42. Optionally, the first thickness 42 may be larger than the third thickness 46. In one embodiment, the third thickness 46 is smaller than the first and second thicknesses 42, 44 to accommodate the length of a roof joint, as described in further detail below. In one embodiment, the first thickness 42 is between about 0.25 inches and about 0.29 inches. The second thickness may be between about 0.29 inches and about 0.41 inches. Optionally, the third thickness 46 is between about 0.14 inches and about 0.16 inches.

During operation, a bar component 62 pushes a roof joint 56 against the second arm 14, and therefore, with the second thickness 44 being larger than the first thickness 42, the clamp 10 is more centered over the axis 61 of the roof joint 56. For example, as generally illustrated in FIG. 4, an axis 61 of the roof joint 56 is relatively close to a central axis 76 of the clamp. The axis 61 of the roof joint extends between vertical portions 52B, 54B of two adjacent panels. In addition, the second thickness 44 in combination with the length of the third arm 22 can provide a larger surface that contacts a roof joint 56 to resist relative movement between the clamp 10 and the roof. It will be appreciated that embodiments of the present disclosure can encompass different relative thicknesses 42, 44, 46.

The various features of the clamp 10 can be described relative to a vertical direction 48, a longitudinal direction 49 (shown in FIG. 1), and a horizontal direction 50. The directions 48, 49, 50 are orthogonal to each other. The first and second arms 12, 14 both extend downwardly in the vertical direction 48. In one embodiment, the arms 12, 14 are generally parallel to each other. Additionally, a first side 72 of the first arm 12 and a second side 74 of the second arm 14 can be approximately parallel to a plane defined by the vertical direction 48. The slot 16 extends upwardly in the vertical direction 48 between the arms 12, 14. A central axis 76 extends in the vertical direction 48 within the slot approximately half-way between the free end 25 of the third arm 22 and the first inner surface 18 of the first arm 12. The aperture 26, the cavity 28, the axis 40, and the third arm 22 extend at least generally in the horizontal direction 50. In one embodiment, the axis 40 is approximately parallel to the horizontal direction 50.

With these relative orientations, the third arm 22 holds the roof joint 56 within the slot 16 and prevents the clamp 10 from being pulled off of the roof joint. In addition, the channel 30 extends into the second arm 14 in the horizontal direction 50, and the channel 30 extends into the third arm 22 in the vertical direction 48. Therefore, when the roof joint 56 is positioned in the channel 30, the first and second protrusions 36, 38 defined by the channel 30 secure and locate the roof joint 56 in a predetermined position within the clamp 10. However, it will be appreciated that embodiments of the present disclosure encompass features extending in different directions to accomplish similar or the same functionality described herein. In addition, directions such as vertical and horizontal and relative relationships such as parallel and perpendicular can be "substantial" meaning a variance of less than 10 degrees. For instance, though two components can be described as perpendicular or substantially perpendicular, embodiments of the present disclosure can encompass the two components being oriented between 80 and 100 degrees.

Referring to FIG. 4, an end view of a clamp 10 positioned over a roof joint 56 is provided. A first roof panel 52 and a second roof panel 54 are joined together at a roof joint 56. In this embodiment, the roof joint 56 is formed by two ends of the roof panels 52, 54 folded or seamed together. As will be appreciate by one of skill in the art, the roof joint 56 may be referred to as a double-folded standing seam. The folded or seamed portion of the roof joint 56 extends to one side of the joint axis 61 over the second roof panel 54 and against a vertical portion 54B of the second roof panel. The roof joint 56 has a top end 58 and a bottom end 60. The bottom end 60 is spaced from a generally horizontal portion 54A of the second roof panel 54 to define a gap between the seamed portion and the generally horizontal portion 54A. In FIG. 4, the roof joint 56 is illustrated as generally oriented vertically (or approximately parallel to the vertical direction 48), but it will be appreciated that the present disclosure encompasses embodiments where the roof joint 56 is in other orientations, such as horizontal.

The slot 16 and channel 30 of the clamp 10 are sized to engage and secure roof joints 56 of a variety of profiles with various dimensions which are provided by different suppliers. In some embodiments, the inclusion of the channel 30 beneficially enables roof joints 56 with smaller profiles to be secured within the clamp 10 while still ensuring that the clamp 10 can accommodate roof joints 56 with larger profiles due to the larger slot 16. For example, the roof joint 56 shown in FIG. 4 has a height between the top end 58 and the bottom end 60 of approximately 0.5 inches. Larger roof joints 56 can be secured within the slot. In one configuration, the clamp 10 of the present disclosure can engage a roof joint 56 with a height between the top and bottom ends 58, 60 of between about 0.25 inches and about 1 inch. In another configuration, the clamp 10 of the present disclosure can engage a roof joint 56 with a height between the top and bottom ends 58, 60 of between about 0.4 inches and 0.8 inches. In another configuration, the clamp 10 of the present disclosure can engage a roof joint 56 with a height between the top and bottom ends 58, 60 of between about 0.5-0.75 inches.

With the roof joint 56 positioned in the slot 16 of the clamp 10, the roof joint 56 is positioned against the second arm 14 such that the first protrusion 36 on the second arm 14 secures the top end 58 against movement in the vertical direction. For example, in one embodiment, at least a portion of the top end 58 may engage with the first protrusion 36. Additionally, or alternatively, a portion of the top end 58 can be pressed into the channel 30. Similarly, the second protrusion 38 on the third arm secures the bottom end 60 against movement in the horizontal direction. In one embodiment, the second protrusion 38 may extend at least partially between the bottom end 60 and the vertically oriented portion 54B of the second roof panel 54. Additionally, or alternatively, the third inner surface 24 of the third arm 22 may contact the bottom end 60 of the roof joint 56. Accordingly, the bottom end 60 may be proximate to (or in contact with) the third inner surface 24 and positioned between the vertically oriented portion 54B and the second inner surface 20.

The first and second protrusions 36, 38 also help locate the roof joint 56 in a predetermined position relative to the clamp 10 for when the bar component 62 extends through the aperture 26. In one embodiment, the bar component 62 can extend through the aperture 26 to contact and deform the roof joint 56 such that a portion of the roof joint 56 extends into the cavity 28. In one embodiment, when the clamp 10 is fixed to the roof joint 56 by the bar component 62, the clamp is spaced from horizontal surfaces 52A, 54A of the first and second roof panels. Accordingly, in one embodiment, the arms 12, 14, 22 of the clamp 10 in FIG. 4 do not extend to the horizontal surfaces 52A, 54A of the first and second roof panels 52, 54. However, in some embodiments, the arms 12, 14, 22 may be sized to extend to these horizontal surfaces to stabilize the clamp 10 relative to the roof.

Figure 5:
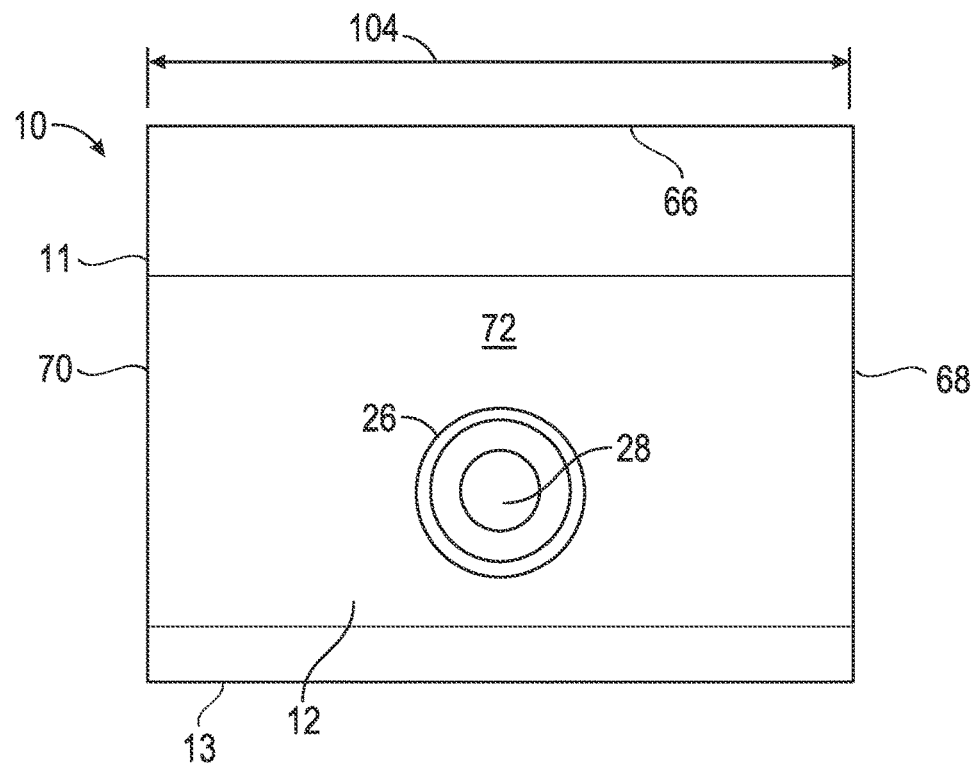
FIG. 5 is a first side elevation view of the clamp in FIG. 1 according to embodiments of the present disclosure.
Figure 6:
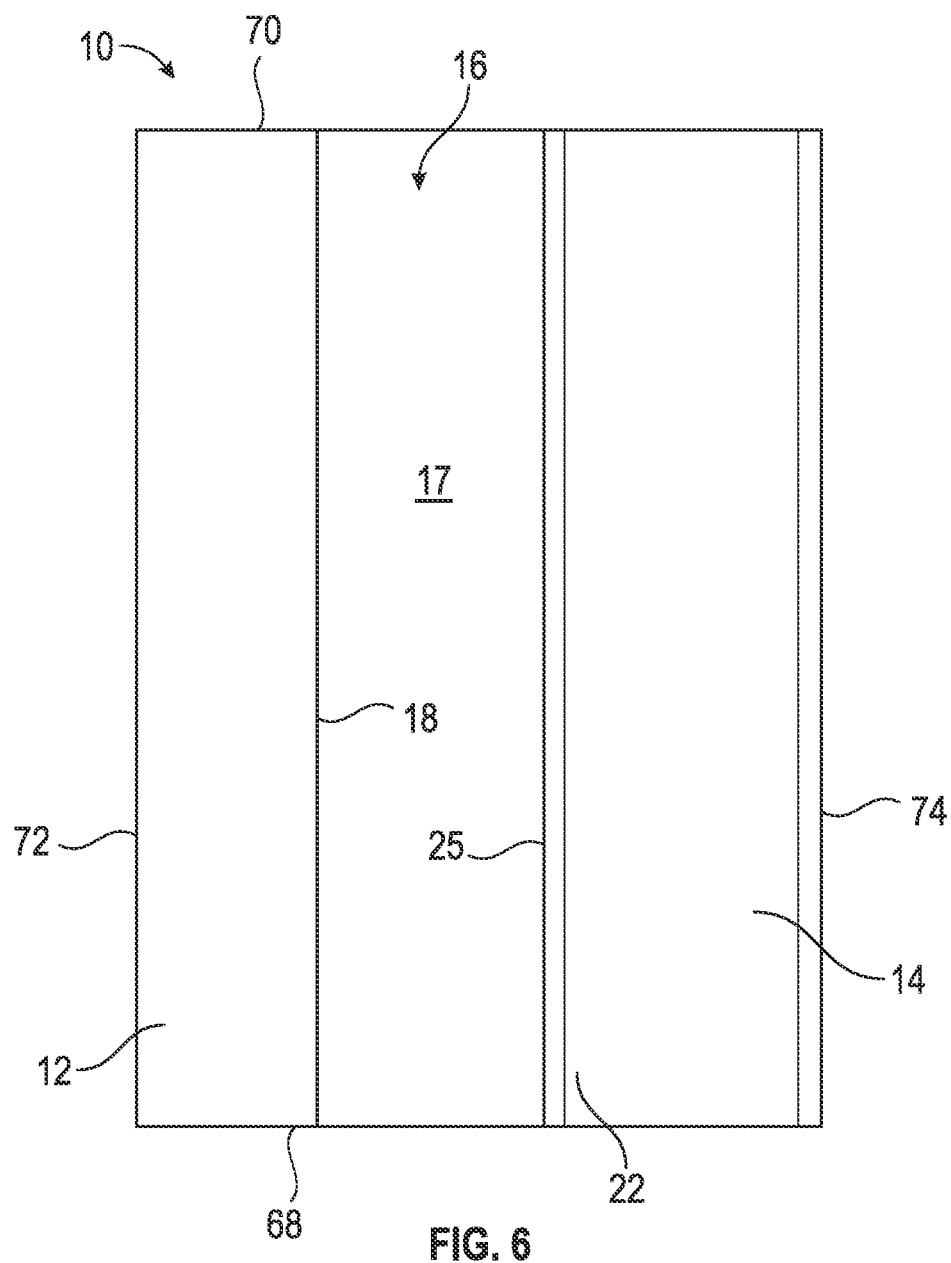
FIG. 6 is a bottom plan view of the clamp in FIG. 1 according to embodiments of the present disclosure.

FIGS. 5 and 6 show further views of the clamp 10. FIG. 5 is an elevation view of a first side 72 of the clamp 10. The clamp body 11 has a length 104 extending between the first and second ends 68, 70. In one configuration, the length is between about 1 inch and about 2.5 inches. Optionally, the length 104 is between about 1.4 inch and about 1.6 inch, or about 1.5 inch.

In one configuration, a center of the aperture 26 through the first arm 12 is positioned on the first side 72 approximately equally distant from the first and second ends 68, 70. In one embodiment, the center of the aperture 26 is positioned between about 0.6 inch and 0.8 inch, or about 0.75 inch from the ends 68, 70.

Additionally, or alternatively, the aperture 26 can be positioned closer to the free end 13 of the first arm 12 than to the top portion 66 of the clamp body 11. In one configuration, the center of the aperture 26 is positioned between about 0.75 inch and about 0.81 inch, or about 0.78 inch from the top portion 66 of the clamp body.

The aperture 26 can be sized to receive a bar component 62 of any diameter or thread count. In one embodiment, the aperture has a diameter of ⅜ inch. Optionally, the aperture has a fine thread of 24 threads per inch. In one embodiment, the aperture includes a countersink of about 0.06 inch. Other dimensions and thread configurations of the aperture are contemplated.

The aperture 26 of the first arm 12 is generally aligned with the cavity 28 formed in the second arm 14. Optionally, the cavity 28 and the aperture 26 are aligned substantially coaxially. In one embodiment, the cavity 28 has a diameter of about 0.36 inch and a depth of between about 0.06 inch and about 0.1 inch.

FIG. 6 is a bottom plan view of the clamp 10 showing the first arm 12, the second arm 14, the third arm 22, and the cavity 16. Notably, in one embodiment, the first end 68 is approximately parallel to the second end 70. Optionally, the first side 72, the second side 74, the first inner surface 18, and the free end 25 of the third arm can be oriented approximately perpendicular to the first and second ends 68, 70.

In one embodiment, the first inner surface 18 is substantially planar. For instance, the first inner surface 18 is free of projections into the slot 16. In one embodiment, only one aperture 26 intersects or interrupts the first inner surface 18.

Figure 7:
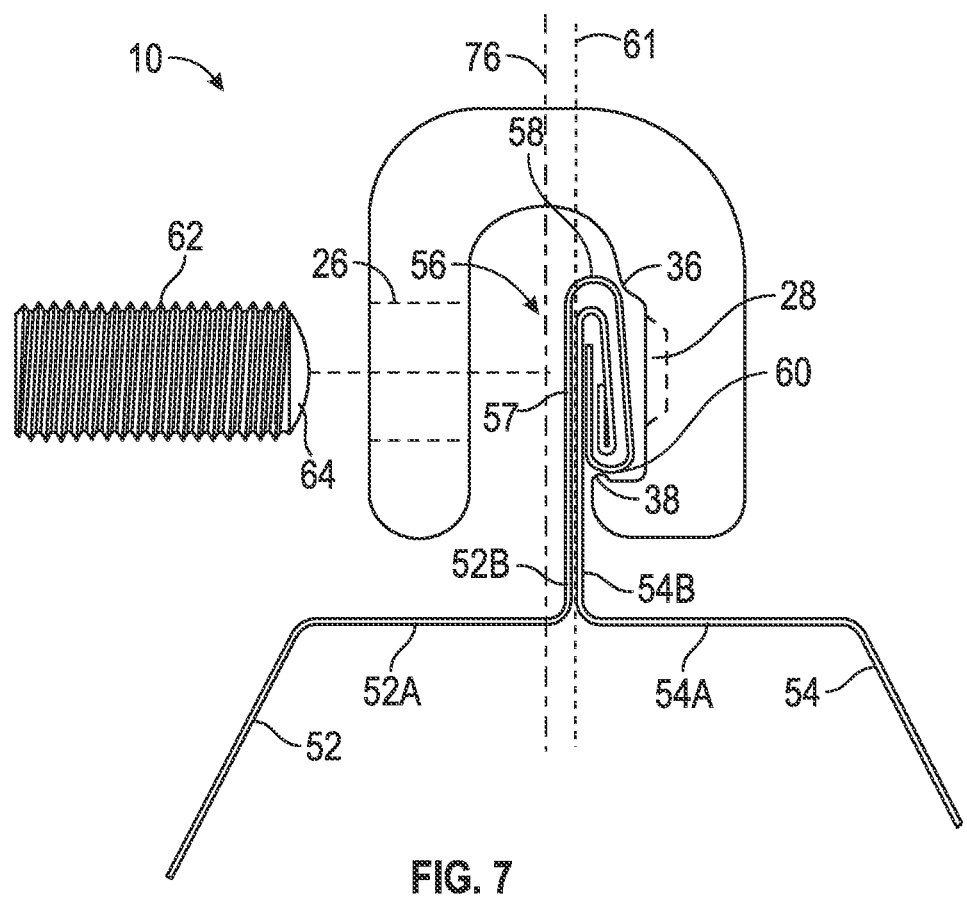
FIG. 7 is a further end elevation view of a clamp, roof panels, and a bar component according to embodiments of the present disclosure.

FIG. 7 is another end elevation view of a clamp 10 positioned on a roof joint 56 with a larger size in the vertical direction 48 than the roof joint 56 shown in FIG. 4. When a force is applied to the roof joint by a bar component 62, the first protrusion 36 can contact and apply a force to a portion of the roof joint 56, such as a sidewall 57 of the roof joint. FIG. 7 shows that even if the roof joint 56 is larger, the second protrusion 38 formed on the third arm 22 can still retain the bottom end 60 of the roof joint 56 to help secure and locate the clamp 10 relative to the roof joint 56. More specifically, the third arm 22 and the second protrusion 38 can be positioned between the bottom end 60 of the roof joint 56 and a horizontal portion 54A of the second roof panel 54. Moreover, when the bar component 62 contacts and/or deforms the roof joint 56 against the first protrusion 36 on the second arm 14, the first protrusion 36 can prevent vertical movement of the roof joint 56 relative to the clamp 10.

Figure 8:
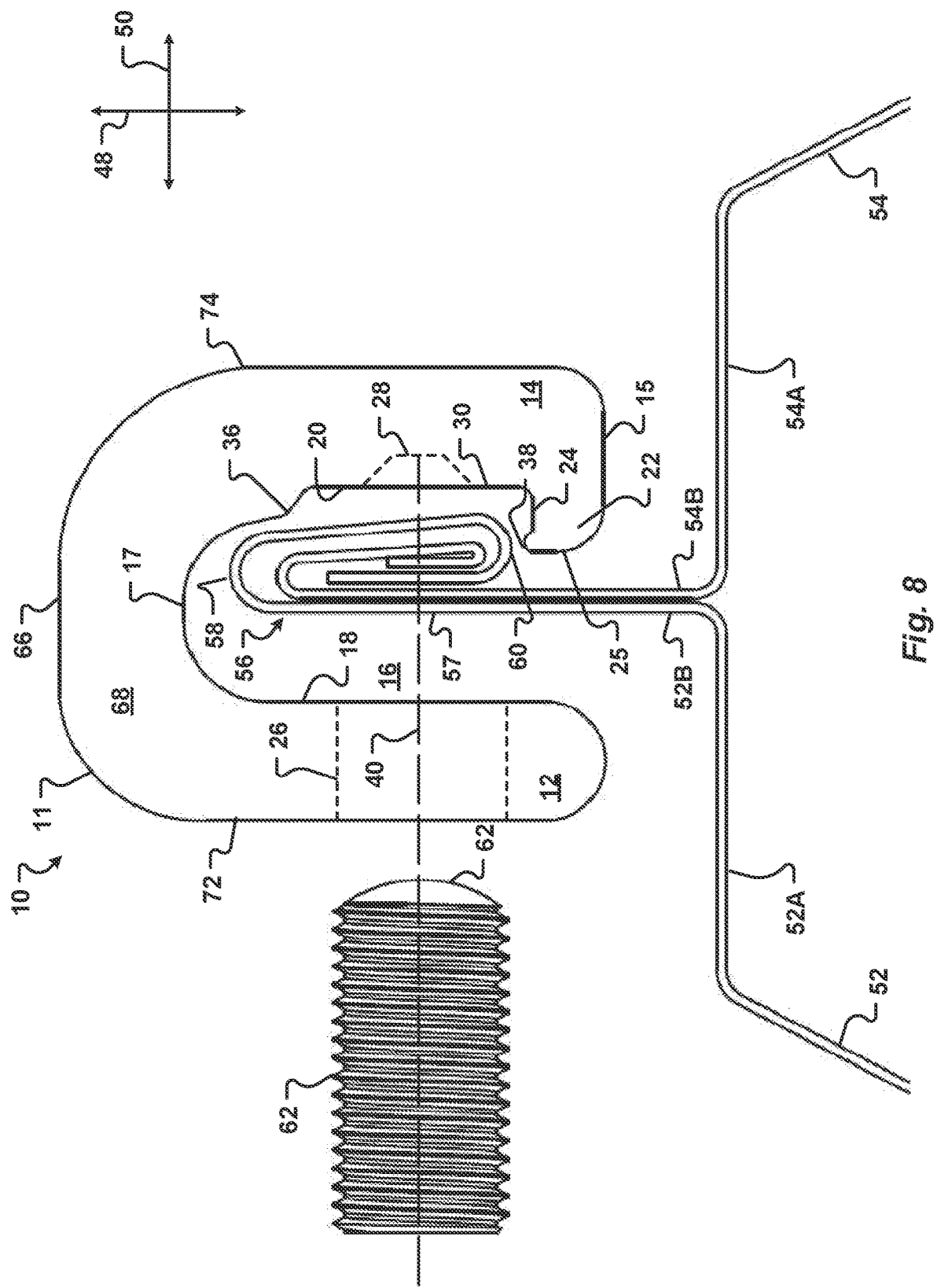
FIG. 8 is another end view showing the clamp proximate to a roof joint of another embodiment.

Referring now to FIG. 8, the clamp 10 is illustrated proximate to another roof joint 56. The roof joint has a larger vertical extent than the roof joints illustrated in FIGS. 4 and 7. However, the slot 16 has a vertical dimension sufficient for the bottom end 60 of the roof joint to fit over the second protrusion 38. Further, the uppermost portion of the slot base 17 is spaced a predetermined distance vertically from the second protrusion. The vertical separation of the slot base from the second protrusion facilitates movement of the top end 58 of the roof joint as the bottom end 60 is moved into position between the second protrusion and the second inner surface 20 as generally illustrated in FIGS. 4, 7. The curved or rounded shape of the slot base 17 also beneficially allows movement of the top end 58 of the roof joint within the slot 16. More specifically, the rounded shape of the slot base 17 permits movement of the slot base 17 relative to the top end 58 as the roof joint 56 is moved into position within the slot and proximate to the channel 30.

Referring now to FIG. 9, various exemplary dimensions of the clamp body 11 are described. More specifically, the first arm 12 has a first height 80 extending between the free end 13 and the top portion 66 of the body 11. The first height 80 may be from about 1 inch to about 1.3 inches.

Similarly, the second arm 14 has a second height 82 between the top portion 66 and the second arm free end 15. Optionally, the first height 80 is approximately equal to the second height 82. Alternatively, the first height 80 can be greater than the second height. In one configuration, the second height 82 is from about 1 inch to about 1.25 inches.

The slot 16 has a height 84 defined by the distance between the slot base 17 and the free end 15 of the second arm. In one configuration, the slot height 84 is between about 0.8 inches and about 1.1 inches.

The channel 30 also has a predetermined height 86 between a lower end of the first protrusion 36 and the third inner surface 24 of the third arm 22. In one configuration, the channel height 86 is from about 0.40 inches to about 0.60 inches.

The slot 16 has a minimum width 88 defined by the first inner surface 18 of the first arm 12 and the free end 25 of the third arm 22. Optionally, the minimum width 88 is from about 0.3 inches to about 0.4 inches, or about 0.34 inches.

Additionally, one or more of the exterior or interior edges of the clamp body 11 can be rounded to avoid scratching or damaging the roof panels 52, 54 or a roof joint 56. Optionally, a first surface 90 of the first arm 12 between the first side 72 of the body and the free end 13 of the first arm is rounded. Optionally, the first surface 90 has a radius of curvature of between about 0.12 inches and about 0.15 inches.

Similarly, a second surface 92 between the free end 13 and the first inner surface 18 may be rounded. In one configuration, the second surface 92 has a radius of curvature of between about 0.12 inches and about 0.15 inches.

In one configuration, a third surface 94 of the second arm 14 is rounded between the second side 74 of the body and the free end 15 of the second arm. The third surface 94 can optionally have a radius of curvature of between about 0.09 inches and about 0.11 inches.

Additionally, or alternatively, a fourth surface 96 between the second arm free end 15 and the free end 25 of the third arm 22 may be rounded or curved. In one configuration, the fourth surface 96 can optionally have a radius of curvature of between about 0.09 inches and about 0.11 inches.

Optionally, a fifth surface 98 between the first side 72 and the top portion 66 is curved. For instance, the fifth surface 98 may have a radius of curvature of between about 0.30 inches and about 0.32 inches.

In still another configuration, a sixth surface 100 between the second side 74 and the top portion 66 is curved. In one embodiment, the sixth surface 100 has a radius of curvature that is greater than the radius of curvature of the fifth surface. Optionally, the sixth surface 100 can have a radius of curvature of between about 0.35 inches and about 1.1 inches.

The clamp body 11 has a width 102 between the first side 72 and the second side 74. Optionally, the width 102 is between about 0.9 inch and about 1.3 inch.

The clamp 10 may be formed from materials such as various metals, ceramics or plastics based upon, for instance, the particular application. For example, the clamp 10 can be formed from aluminum which provides sufficient load-bearing capability and is also non-corrodible, thus enhancing durability and appearance. As can be appreciated, the aluminum can be anodized to further enhance the appearance of the roof assembly. Other metals for forming the clamp are stainless, zinc, copper or brass alloys. The clamp 10 may also be formed by a variety of methods or combinations of methods, one of which methods is extrusion.

The body 11 of the clamp 10 generally has a cross-section defined by a slot 16 which is configured to receive the roof joint 56 therein. The edges of the body may be chamfered or rounded (with the same or with different radii of curvature) if desired to reduce material requirements (and hence the cost of the clamp 10). Upper edges 98, 100 in particular may be rounded to enhance the appearance of the roof assembly (e.g., because rounded edges are less noticeable against, for example, a roof than are surfaces with sharp corners or edges). Rounded lower edges 90, 92, 94, and 96 prevent the clamp 10 from digging or cutting into the roof during installation and/or if and when wind causes a roof or portion thereof to flex upward and contact one or more of the edges 90, 92, 94, and 96.

In some embodiments, the rounded edges 90, 92, 94, 96, 98, 100 also reduce weight of the clamp body 11. This is beneficial because the reduced weight of the clamp body transfers less force to the roof and roof joint 56 reducing the potential to damage the roof when a plurality of clamps 10 are positioned on the roof. Additionally, reducing the weight of the clamp body 11 may beneficially reduce transportation costs associated moving clamps 10 to a work site. Another benefit of rounding at least the surfaces 98, 100 is that the surface areas of the first and second sides 72, 74 is reduced by a corresponding amount. Accordingly, the curved surfaces 98, 100 may streamline the clamp body 11 and reduce forces transferred to the clamp body 11 by wind, improving the ability of the clamp to resist inadvertent movement relative to a roof joint 56.

Optionally, the slot base 17 can be rounded or curved between one or more of the first inner surface 18 and the second inner surface 20. The rounded or curved shape of the slot base 17 may beneficially reduce the likelihood of damaging a top end 58 of a roof joint 56. For example, the rounded slot base 17 may increase the area of contact between the clamp body 11 and the roof joint 56.

In addition to avoiding damage to the roof joint 56, by rounding the slot base 17 may strengthen the clamp body 11 by reducing the concentration of stress between the intersection of first and second arms 12, 14 with the slot base 17. For example, if the arms 12, 14 inserted the slot base 17 at corner, or a right angle, stress in the body 11 may be concentrated at the corner. As will be appreciated by one of skill in the art, high local stress at a corner formed by the intersection of an arm and a slot base could cause the body of a clamp to fail more quickly compared to an embodiment of the clamp body with a rounded or arcuate slot base 17.

In some embodiments, the clamp may be manufactured as a single, integral piece. For example, the clamp 10 may be of one-piece construction. Additionally, the clamp 10 can be characterized as lacking any joints of any kind. Accordingly, in one embodiment, the clamp body 11 is configured so as to have no separable parts. However, the clamp 10 can include at least one threaded aperture 26 through the clamp body 1 to receive a bar component 62 (such as a set screw or threaded fastener) to secure the clamp 10 to a roof joint 56.

Optionally, the clamp body 11 of one embodiment of the present disclosure consists of only one aperture 26. More specifically, the clamp body 11 may be designed to receive only one bar component 62. Accordingly, in one embodiment, a clamp 10 of the present disclosure may consist of a clamp body 10 with one aperture 26 and only one bar component 62. In this manner, manufacturing costs are reduced as only the one aperture 26 is formed in the clamp body. The clamp body 11 with only one aperture 26 is configured to engage a roof joint 56 without engaging other clamps or fasteners.

To provide additional background, context, and to further satisfy the written description requirements of 35 U.S.C. § 112, the following references are incorporated by reference herein in their entireties: U.S. Pat. Nos. 6,718,718; 7,758,011; 8,844,234; 8,910,928; 9,611,652; 9,920,958; 10,077,562; and U.S. Pat. App. Pub. 2018/0128295.

Ranges have been discussed and used within the forgoing description. One skilled in the art would understand that any sub-range within the stated range would be suitable, as would any number or value within the broad range, without deviating from the disclosure. Additionally, where the meaning of the term "about" as used herein would not otherwise be apparent to one of ordinary skill in the art, the term "about" should be interpreted as meaning within plus or minus five percent of the stated value.

Throughout the present disclosure, various embodiments have been disclosed. Components described in connection with one embodiment are the same as or similar to like-numbered components described in connection with another embodiment.

Although the present disclosure describes components and functions implemented in the aspects, embodiments, and/or configurations with reference to particular standards and protocols, the aspects, embodiments, and/or configurations are not limited to such standards and protocols.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A clamp configured to engage a joint connecting two metal panels of a surface of a building, comprising:
   a first end opposite a second end;
   a top surface extending between the first and second ends;
   a first arm extending away from the top surface and comprising:
      a first outer surface;
      a first free end spaced from the top surface; and
      a first inner surface;
   a second arm opposite to the first arm, the second arm extending away from the top surface and comprising:
      a second outer surface;
      a second free end spaced from the top surface; and
      a second inner surface facing the first inner surface;
   a slot defined by the first inner surface of the first arm, the second inner surface of the second arm, and a slot base extending from the first inner surface to the second inner surface;
   a channel extending into the second inner surface of the second arm, the channel comprising:
      an upper end spaced from the slot base;
      a lower end positioned between the upper end of the channel and the second free end of the second arm; and
      a cavity within the channel,
   wherein the second arm comprises:
      a first thickness measured in a horizontal dimension at a first position between the upper and lower ends of the channel; and
      a second thickness measured in the horizontal dimension at a second position between the upper end of the channel and the slot base, the second thickness being greater than the first thickness;
   an aperture extending through the first arm, the aperture extending along an axis that intersects the cavity within the channel, wherein the aperture is threaded;
   a projection extending from the second inner surface of the second arm into the slot, the projection including an upper surface facing away from the second free end of the second arm;
   a first protrusion extending from the upper surface of the projection and toward the top surface of the clamp, the first protrusion configured to engage the joint when the joint is positioned in the slot, wherein the first protrusion and the projection are formed of a portion of the second arm, and wherein the first protrusion of the projection is configured to engage a bottom portion of the joint; and
   a set screw configured to extend through the aperture and into the slot, the set screw comprising exterior threads.

2. The clamp of claim 1, wherein the clamp consists of only one aperture extending through the first arm, and wherein no aperture extends through the second outer surface to the second inner surface of the second arm.

3. The clamp of claim 1, wherein the aperture is configured such that a distal end of the set screw can engage a side surface of the joint positioned within the slot.

4. The clamp of claim 1, wherein the axis of the aperture is at least one of:
   oriented approximately parallel to the horizontal dimension; and
   oriented approximately perpendicular to the first outer surface of the first arm.

5. The clamp of claim 1, wherein at least a portion of the first inner surface of the first arm is parallel to at least a portion of the second inner surface of the second arm, and wherein the first outer surface of the first arm is approximately parallel to the second outer surface of the second arm.

6. The clamp of claim 1, wherein no apertures extend through the top surface or through the slot base such that the slot is inaccessible from the top surface.

7. The clamp of claim 1, wherein the slot base has an arcuate shape, and wherein the clamp is of a one-piece construction.

8. The clamp of claim 1, wherein the channel of the second arm is offset from the second free end of the second arm by a predetermined distance.

9. The clamp of claim 1, wherein the cavity within the channel is centered on the axis of the aperture.

10. The clamp of claim 1, wherein the slot and the channel extend through the clamp from the first end to the second end of the clamp, and wherein the first and second ends of the clamp are approximately perpendicular to the top surface of the clamp.

11. The clamp of claim 1, wherein the channel of the second arm defines a second protrusion on the second arm that is configured to engage an upper portion of the joint when the joint is positioned within the slot.

12. The clamp of claim 1, wherein the second thickness of the second arm is greater than a thickness of the first arm measured in the horizontal dimension at a position between the first free end of the first arm and the slot base.

13. A clamp configured to engage a joint connecting two metal panels of a surface of a building, comprising:
   a body with a top surface, a first end, and a second end opposite the first end;
   a first arm extending away from the top surface and comprising:
     a first outer surface;
     a first free end spaced from the top surface; and
     a first inner surface;
   a second arm opposite to the first arm, the second arm extending away from the top surface and comprising:
     a second outer surface;
     a second free end spaced from the top surface; and
     a second inner surface facing the first inner surface;
   a slot that extends from the first end to the second end and which is defined by the first inner surface of the first arm, the second inner surface of the second arm, and a slot base extending from the first inner surface to the second inner surface;
   a channel extending into the second inner surface of the second arm and extending from the first end to the second end, the channel comprising:
     an upper end spaced from the slot base; and
     a lower end positioned between the upper end of the channel and the second free end of the second arm; and
   an aperture extending through the first arm, the aperture extending along an axis that intersects the channel, wherein the axis of the aperture intersects a cavity formed within the channel and the cavity is spaced from the first and second ends of the body, wherein only one aperture extends through the first arm, and wherein no hole extends through the second outer surface of the second arm.

14. The clamp of claim 13, wherein the aperture is threaded.

15. The clamp of claim 13, further comprising a set screw selectively extendable through the aperture and into the slot, wherein a distal end of the set screw is selectively engageable with a side surface of the joint when the joint is positioned within the slot.

16. The clamp of claim 13, wherein no apertures extend through the top surface.

17. A clamp configured to engage a joint connecting two metal panels of a surface of a building, comprising:
   a body with a top surface;
   a first arm extending away from the top surface and comprising:
     a first outer surface;
     a first free end spaced from the top surface;
     a first inner surface; and
     an aperture extending through the first arm, the aperture being threaded;
   a second arm opposite to the first arm, the second arm extending away from the top surface and comprising:
     a second outer surface;
     a second free end spaced from the top surface; and
     a second inner surface facing the first inner surface;
   a slot defined by the first inner surface of the first arm, the second inner surface of the second arm, and a slot base extending from the first inner surface to the second inner surface;
   a channel extending into the second inner surface of the second arm, the channel comprising:
     an upper end spaced from the slot base; and
     a lower end positioned between the upper end of the channel and the second free end of the second arm;
   a projection extending from the second inner surface of the second arm into the slot, the projection including an upper surface facing toward the slot base;
   a first protrusion extending from the upper surface of the projection and toward the slot base;
   wherein the first arm comprises a first thickness measured in a horizontal dimension at a position between the first free end of the first arm and the slot base;
   wherein the second arm comprises a second thickness measured in the horizontal dimension at a position between the upper end of the channel and the slot base, the second thickness being greater than the first thickness;
   wherein the channel comprises a third thickness measured in the horizontal dimension between the upper and lower ends of the channel, the third thickness being less than the second thickness; and
   wherein no hole extends through the top surface.

18. The clamp of claim 17, wherein the aperture extends along an axis that intersects a cavity positioned within the channel, and wherein the clamp comprises a set screw selectively extendable through aperture and into the slot such that a distal end of the set screw is selectively engageable with a side surface of the joint when the joint is positioned within the slot.

19. The clamp of claim 17, wherein only one aperture extends through the first arm, wherein no holes extend through the second outer surface toward the slot, and wherein no holes extend through the slot base.

20. The clamp of claim 17, wherein the first and second ends of the clamp are approximately perpendicular to the top surface of the clamp.

\* \* \* \* \*